United States Patent
Cathenaut et al.

(10) Patent No.: US 6,534,106 B2
(45) Date of Patent: *Mar. 18, 2003

(54) PROCESS FOR MOLDING FROZEN ICE CONFECTIONERY COMPOSITIONS INTO ARTICLES

(75) Inventors: Philip Igor Cathenaut, Beauvais (FR); Bruno Delande, Marseille en Beauvaisis (FR)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,390
(22) Filed: May 12, 1999
(65) Prior Publication Data
US 2002/0018833 A1 Feb. 14, 2002

(30) Foreign Application Priority Data
May 13, 1998 (EP) .............................. 98201562

(51) Int. Cl.⁷ .................................. A23P 1/10
(52) U.S. Cl. ................. 426/317; 426/389; 426/515; 426/519; 426/524; 62/70
(58) Field of Search ................ 426/512, 515, 426/524, 565, 317, 389, 519; 62/69, 70, 344, 356

(56) References Cited

U.S. PATENT DOCUMENTS

| 1,685,460 A | 9/1928 | Myers et al. |
| 1,693,988 A | 12/1928 | Kuhn |
| 1,801,578 A | 4/1931 | Stevens |
| 3,166,025 A | 1/1965 | Hulse |
| 3,437,722 A | 4/1969 | Cronin et al. ............ 264/48 |
| 3,632,245 A | 1/1972 | Getman ............ 425/130 |
| 4,188,768 A | 2/1980 | Getman ............ 53/282 |
| 4,346,120 A * | 8/1982 | Morley et al. ............ 426/565 |
| 4,477,473 A * | 10/1984 | Schoonmaker et al. ...... 426/231 |
| 4,566,612 A | 1/1986 | von Kreuter ............ 222/309 |
| 4,648,829 A * | 3/1987 | Cattani ............ 425/326.1 |
| 4,659,575 A * | 4/1987 | Fiedler ............ 426/317 |
| 4,746,523 A * | 5/1988 | Binley ............ 426/249 |
| 4,916,920 A * | 4/1990 | Weis et al. ............ 62/342 |
| 5,069,364 A | 12/1991 | McGill ............ 222/95 |
| 5,172,835 A | 12/1992 | Hudcovic et al. ............ 222/380 |
| 5,435,143 A * | 7/1995 | Heinrich ............ 62/75 |
| 5,464,120 A | 11/1995 | Alpers et al. ............ 222/1 |
| 5,718,354 A | 2/1998 | Binley ............ 222/1 |
| 5,738,895 A * | 4/1998 | Fuchs et al. ............ 426/515 |
| 5,758,571 A * | 6/1998 | Kateman et al. ............ 99/455 |
| 5,894,030 A * | 4/1999 | Gibson et al. ............ 426/524 |
| 5,948,456 A * | 9/1999 | Jones et al. ............ 426/100 |
| 6,006,535 A | 12/1999 | Cathenaut ............ 62/345 |
| 6,187,365 B1 * | 2/2001 | Vaghela et al. ............ 426/565 |

FOREIGN PATENT DOCUMENTS

| GB | 992262 | 5/1965 |
| GB | 2 230 057 A | 10/1990 |
| WO | WO 89/05096 | 6/1989 |
| WO | WO 95/16134 | 6/1995 |

* cited by examiner

Primary Examiner—Keith Hendricks
Assistant Examiner—Drew Becker
(74) Attorney, Agent, or Firm—Winston & Strawn

(57) ABSTRACT

Molded ice confectionery articles are prepared by delivering a hard ice confectionery composition to a metering device chamber under a pressure greater than atmospheric pressure, keeping the composition in the device chamber under a pressure greater than atmospheric pressure and metering the composition from the composition from the device chamber under a pressure greater than atmospheric pressure into a mold member positioned in an environment for freezing the composition metered into the mold member for obtaining a molded frozen article. So operating allows the composition delivered to the device chamber to have a percentage of frozen water to total water of at least 50%.

14 Claims, 2 Drawing Sheets

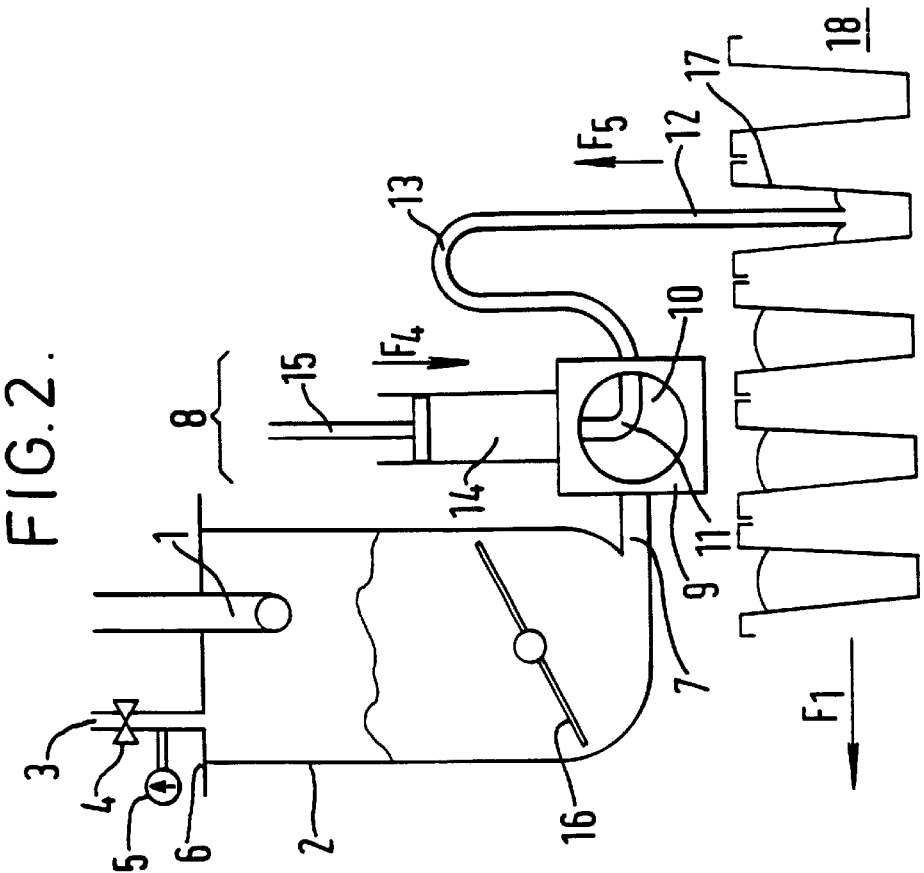
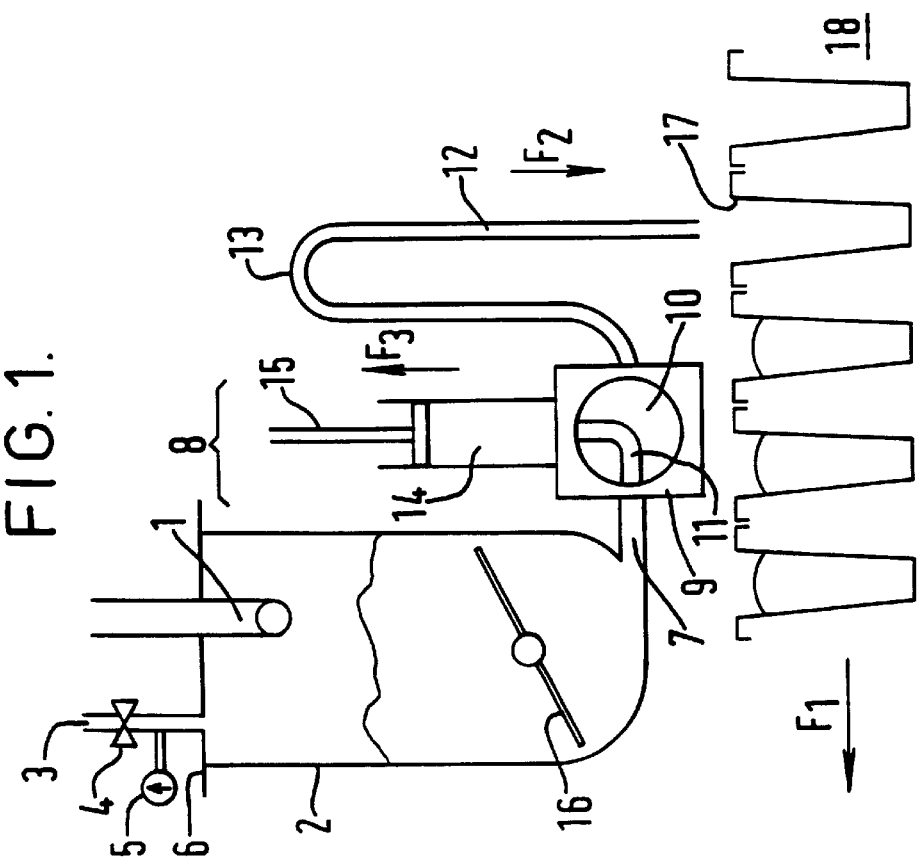

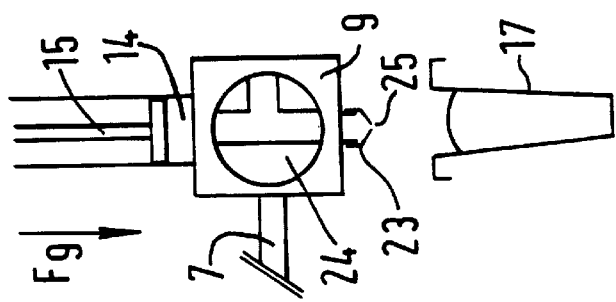
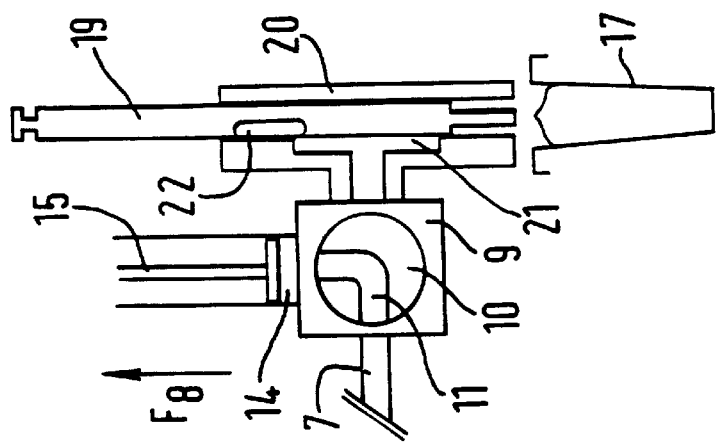
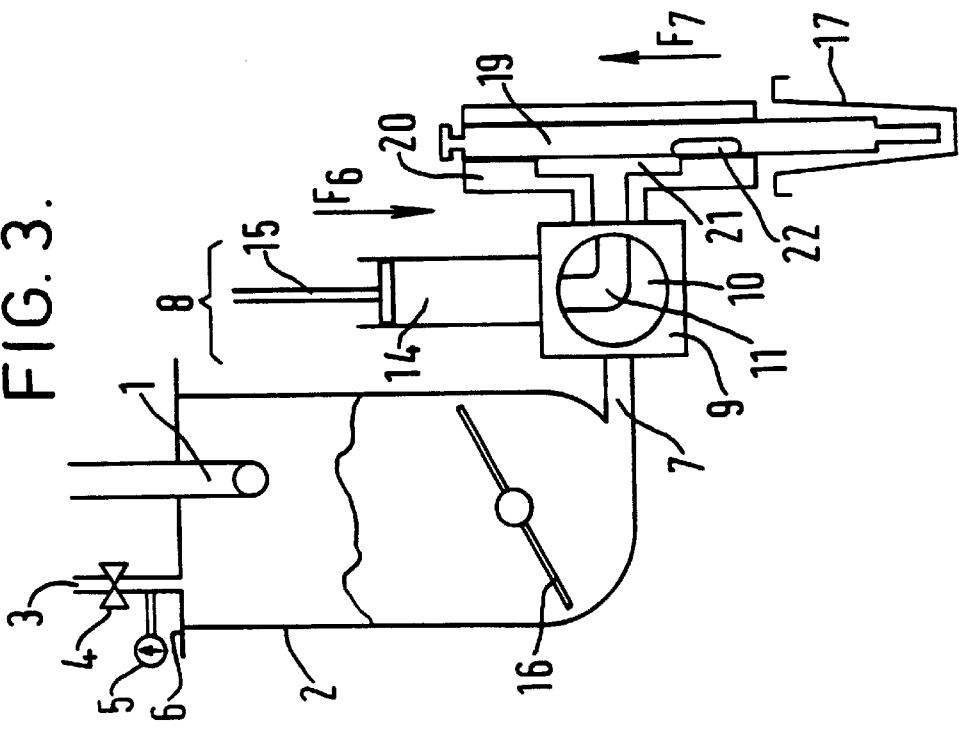

PROCESS FOR MOLDING FROZEN ICE CONFECTIONERY COMPOSITIONS INTO ARTICLES

BACKGROUND OF THE INVENTION

The present invention relates to preparation of frozen confectionery articles and more particularly to procedures for preparing the articles with a moulding procedure and particularly to delivering a confectionery substance to moulds for moulding into frozen articles.

Small frozen confectionery sticks are manufactured on an industrial scale by means of moulding or by means of extrusion.

When extrusion is employed, a sausage shape of plastic consistency, which is relatively hard at a temperature of the order of −6° C. to −7° C., is extruded vertically at the exit from a freezer and then cut into sections. Extrusion gives the products a fine, less crystallized texture than that of moulded products. The fine texture obtained by means of extrusion is largely due to the freezing conditions in a freezer and, in particular, to the freezing temperature at the exit from the freezer. That is to say, the lower the temperature, fewer large crystals are formed. This means that the faster the freezing, the smaller the ice crystals and the finer the texture. In a freezer, freezing speed is at its maximum thanks to mixing and to the continual scraping of the wall which allow accelerated freezing of the water. A drawback of this method is that the shape of the extruded products is limited.

The freezing of a liquid composition to be frozen by means of moulding through simple thermal conduction in a mould immersed in a refrigerating solution is slower and leads to the formation of considerably larger crystals. In this process, the composition to be frozen is always metered out in the liquid state into moulds with a view to guaranteeing satisfactory filling and to preventing the creation of air pockets, and its temperature is of the order of −2° C. to −3° C. The proportion of frozen water is low and most of the process of freezing the product takes place in the moulds. This explains the presence of a coarser, more crystallized texture, owing to an increase in the size of the crystals.

U.S. Pat. No. 3,632,245, for example, describes an apparatus for multi-track manufacturing short frozen sticks by means of moulding, in which rows of cells are simultaneously filled with a metered quantity of liquid composition to be frozen from distribution hoppers associated with volumetric metering devices comprising cylinders constituting metering chambers in which the liquid is successively aspirated and then expelled by means of metering pistons. After this filling operation, the cells travel in a refrigerating liquid so that the articles are frozen. As the composition to be frozen is liquid, the mere drop in pressure created by the displacement of the piston in its chamber allows perfect filling of the cylinders. Thus, identical filling of the cylinders allows the simultaneous metering of an identical volume into the moulds for all the tracks.

SUMMARY OF THE INVENTION

The object of the present invention is to provide moulded products of which the quality is similar to that obtained previously in the case only of extruded products by metering a hard ice confectionery composition under a pressure greater than atmospheric pressure into a mould.

The invention thus provides a process for moulding frozen confectionery in which containers passing through a solidifying environment are filled with a predetermined volume of composition by means of a volumetric metering device connected to a distribution hopper, the metering device comprising a metering chamber which is filled with composition in the aspiration phase and a metering element which expels the predetermined volume of composition from the chamber in the metering phase, and which is characterized in that a hard ice confectionery composition is metered out whilst being kept under pressure upstream of the metering element and in that the distribution hopper, which is kept under pressure, allows a continuous supply to the metering chamber so as to fill the moulds without the formation of air pockets.

DETAILED DESCRIPTION OF THE INVENTION

In the context of the present invention, a hard ice confectionery composition is an ice cream, which may be a frozen cream, a milk ice, or a water ice, which may or may not be aerated, and the term "hard ice confectionery composition" is used below to refer to such compositions without distinction. In the present invention, the hard ice confectionery ice composition is prepared in and emerges from a freezer at a temperature of from −6° C. to −7° C. Its texture is firmer than a conventional liquid composition to be frozen and it has a percentage of frozen water relative to the total water of the recipe of 50% or more, particularly 50 to 70%, depending on the composition of the mixture to be frozen. The hard confectionery composition, particularly an ice cream, may contain inclusions such as, for example, pieces of dried or candied fruit, pieces of jelly or fondant, crunchy pieces, sauce, caramel pieces, or pieces of chocolate or biscuit.

The process of the present invention may be carried out with a device for moulding frozen confectionery articles by filling containers passing through a solidifying environment with a predetermined volume of a hard ice confectionery composition and which comprises:

a distribution hopper containing the composition;

means for metering the composition which are linked to the hopper, comprising a metering chamber, a metering element, a metering nozzle and a valve communicating either with the hopper and the metering chamber during the aspiration phase or with the metering chamber and the metering nozzle during the filling phase; and which is characterized in that the hopper is sealed and non-deformable and in that the device comprises means for maintaining a pressure over the composition during the aspiration phase so as entirely to fill the metering chamber.

The device may be applied to any machine for freezing frozen confectionery articles such as, for example:

a machine for freezing in brine, which is rectilinear, rotary, oval or in square movement;

a freezing machine which uses a liquid, gaseous or evaporating refrigerating fluid, which coats the moulds or sprays them for reasonably long periods;

a machine in which the moulds are transported by a conveyor in a pulsed-air tunnel to effect fast freezing, it being possible for the conveyor to be rectilinear or to be wound, for example, as a simple or double helix, which is flattened or of revolution; or any machine of the above type in which the displacement of the moulds is continuous or stepwise.

The device may be applied very simply to existing machines by converting the metering devices so that an overpressure is created in the metering hopper, for example, by closing it by means of a lid, by rendering it gas-tight and by connecting it to a source of fluid, particularly a compressed gas, for example, compressed air. This principle of metering under pressure may apply to various types of metering devices such as, for example, metering devices with a dispensing casing and with vertical or horizontal cylinders, metering devices with valves or metering devices with immersed nozzles of the bottom-up-filler and pencil-filler type.

BRIEF DESCRIPTION OF THE DRAWING FIGURES

The invention is described in greater detail by way of illustration with the aid of the accompanying drawings.

DETAILED DESCRIPTION OF THE DRAWING FIGURES

FIG. 1 is a diagrammatic view of the device during the phase of filling the metering chambers.

FIG. 2 is a diagrammatic view of the device of FIG. 1 during the phase of filling a moulds.

FIG. 3 is a diagrammatic view of a variant of the device just prior to the filling of a moulds.

FIG. 4 is a partial diagrammatic view of the device of FIG. 3 just after the filling of a moulds.

FIG. 5 is a partial diagrammatic view of a second variant of the device just after the filling of a mould.

In FIGS. 1 and 2, a pipe 1, side-connected to the hopper 2, feeds the latter with ice cream at −6° C. to −7° C. emerging from a freezer. A pipe 3 conveys compressed air into the hopper 2 so as to place it under a pressure of 1.5–2 bar. The pressure in the hopper is regulated by a valve 4 and controlled by a manometer 5. The hopper 2 is closed by a lid 6 and the hopper/lid assembly is non-deformable and preferably gas-tight. The hopper/lid assembly may be, preferably, temperature-controlled. At the bottom of the hopper 2, a pipe 7 delivers the ice confectionery composition to the volumetric metering device 8 which comprises a hollow body 9 or casing in which a cylindrical valve 10, perforated with as many passages 11 as there are metering tracks (for reasons of clarity, only one track is shown), allows communication with the hopper 2 and with the metering nozzle 12 by means of the interposition of the strengthened flexible hose 13, by swinging through a quarter of a revolution. The metering device 8 comprises a metering chamber 14 and a metering piston 15. The rotary valve 10 may be replaced by a set of double slide valves, which fulfil the same function but make the metering device bulkier. A mixer 16 force-feeds the pipe 7 communicating with the casing 9. The nozzle 12 is secured to an up-and-down support (not shown), allowing it to descend into the moulds 17 and to rise out of the moulds 17. The moulds 17 are cooled before and/or after they have been filled by means of a refrigerating vector. Moulding may apply to any mould in one or several parts in contact with any liquid, gaseous or solid refrigerating environment such as, for example, brine, a glycolated water solution, pulsed air, liquid nitrogen or solid carbon dioxide. The nozzle 12 may also be secured under a valve (not shown) which, by closing just after metering, prevents too much of the ice cream being metered out or prevents it dripping owing to the residual volume contained in the flexible hose 13.

In FIG. 1, in a production situation, an empty mould 17, passing stepwise on a conveyor line 18 in the direction of the arrow f1 is presented under the nozzle 12. The latter is made to descend to the bottom of the mould 17 according to f2, whilst the cylinder 14 constituting the metering chamber is filled with composition pushed from the hopper 2 by the compressed air via the pipe 7, then the passage 11 of the valve 10, and the piston 15 rises again according to f3.

As indicated in FIG. 2, the valve 10 has swung through a quarter of a revolution, which places the cylinder 14 in communication with the pipe 13 by means of the interposition of the passage 11. The piston 15 descends according to f4 and the precise volume of ice cream contained in the cylinder 14 fills the mould 17 by means of the nozzle 12 which rises progressively according to f5, as filling proceeds.

In FIGS. 3 and 4, the metering principle is the same as that described above, except that the nozzle 19 slides in a dispenser 20 which is integral with the casing 9.

In FIG. 3, the cylinder 14 provides for metering the ice confectionery composition by the descent with ice cream and this is metered out by the descent of the piston 15 according to f6 via the channel 11 and the window 21 made in the body of the dispenser 20, when communicating with the window 22 of the nozzle 19 illustrated as being presented in the bottom of the mould 17. The nozzle 19 is actuated by a pressure cylinder (not shown), which raises it progressively according to f7 during filling.

After the mould 17 has been filled, as shown in FIG. 4, the valve 10 turns through ¾ of a revolution, which places the cylinder 14 in communication with the pipe 7 connected to the hopper by means of the interposition of the passage 11. The piston 15 is then in a position in which it is ready to aspirate and it rises according to f8.

In this case, dead volumes are minimized and the valve 10 is synchronized with the descent and rise of the nozzle, using an automatic programme.

According to an operational variant, provision may be made for the nozzle to remain stationary and for the mould to be taken by an up-and-down device, i.e. it is lifted at the start of filling and then progressively lowered during filling.

In the variant of FIG. 5, the metering device is provided with a static nozzle 23 placed directly below the casing 9 in straight connection with the cylinder 14. The three-way rotary valve 24 allows communication between the pipe 7 connected to the hopper, the cylinder 14 and the nozzle 23. During filling, the piston 15 descends according to f9 and meters out the ice cream into the mould 17. The nozzle 23 has a narrow opening 25, for example <4 mm in diameter, which allows the ice cream to be made sufficiently fluid by means of shearing and the mould 17 to be filled satisfactorily. In this variant, there is no longer any need for an up-and-down nozzle support and therefore the overall size is minimized.

In an embodiment which is particularly adapted to a multi-track manufacturing line, not shown for reasons of simplification, a hopper, such as 2, which is common to all the tracks and has a generally cylindrical shape, is arranged horizontally, transverse to the tracks, has two ice-cream supply pipes, such as 1, arranged on each side of the cylinder and exit pipes for the ice cream, such as 7, arranged opposite each track. An agitator/distributor, such as 16, comprises a rotary shaft positioned in the axis of the cylinder and blades secured transversely to the said shaft of the agitator, on either side of the said shaft in a position in which they are staggered with respect to one another. The blades are arranged in an offset manner relative to the exit pipes for the ice cream, opposite spaces located on either side of the said exit pipes. The blades preferably have a length such that their end is in the vicinity of the inner wall of the cylinder, a helical shape and an orientation with an angle which, closer to the central part of the cylinder, is increasingly less pronounced, making it possible for the flows of ice cream originating from the supply pipes to be preferentially directed towards the central part of the cylinder so as to offset the preferential flows towards the ends. In this way, the ice cream is distributed homogeneously between the various exit pipes and is able to force-feed the metering chambers without the creation of an air pocket.

During operation, the agitator/distributor is actuated in slow rotation by means of a motor outside the hopper, engaging on the shaft of the agitator, for example a pneumatic motor, and the seal may be provided, for example, by a lip seal on the motor side and by a packing box on the other side of the cylinder. The hopper is fed continuously. If the level of ice cream rises in the hopper, the air pressure increases in its upper part. This increase in pressure, compared with a reference value, may generate a signal which acts on the closure of a valve, such as 4, or on the reduction of the speed of the pump supplying product from the freezer, so as to reduce its rate of flow.

A major advantage of the above cylindrical hopper is that, owing to its geometry, it may be cleaned by chemical agents and, if appropriate, sterilized, for example using hot water or steam, whilst remaining in situ without dismantling.

The advantages provided by the process and the device over traditional moulding means are many:

- it is possible to meter out an ice confectionery composition which contains much more water in the frozen state than in the past, with a corresponding improvement in the texture which is usually encountered only in extruded articles, irrespective of the fat content;
- the freezing time may be reduced by 30 to 50%, which allows a greater production rate and improved productivity for the line;
- the viscosity of the ice cream is such that the inclusions it contains, if appropriate, may be distributed in uniform manner without settling as in the case of a liquid metered ice cream;
- it is possible to manufacture composite articles by metering out the ice cream by means of a sheathing nozzle, so as to form a shell which remains in place on the wall of the mould, and it is then possible to fill the centre so that a frozen confectionery core of a different type is formed thereby producing a contrast in texture and/or taste;
- it is possible to manufacture "three-dimensional" or "non-demouldable" articles by using multi-part moulds; and
- the articles, being colder, may be more easily coated, for example with a coating which has a fatty composition, with a water ice, with a sorbet or with an emulsion.

The device and the process have been described in connection with the manufacture of frozen lollies. They may, of course, be used to manufacture other moulded articles such as, for example, cones or tubs. The device has been described with reference to the drawings in connection with one metering track for reasons of simplification. Naturally, a machine in a manufacturing situation may comprise up to 20 parallel metering tracks.

We claim:

1. A process for preparing a molded ice confectionery article comprising:
    preparing a frozen ice confectionery composition in a solidifying environment;
    continuously feeding the frozen ice confectionery composition at a temperature of −6° C. to −7° C. from the solidifying environment into a hopper;
    conveying a compressed gas into the hopper to maintain the frozen ice confectionery in the hopper at greater than atmospheric pressure;
    delivering the pressurized frozen ice confectionery composition from the hopper into a metering device to measure a predetermined volume of the frozen ice confectionery composition;
    filling a mold with the predetermined volume of the frozen confectionery composition and maintaining the composition in a frozen condition in the mold; and
    maintaining the frozen ice confectionery composition under a pressure greater than atmospheric pressure from the hopper through to filling the mold, wherein the frozen ice confectionery composition contains a plurality of inclusions comprising at least one of dried fruit pieces, candied fruit, chocolate pieces, fondant pieces, caramel pieces, or biscuit pieces.

2. A process for preparing a molded ice confectionery article comprising:
    preparing a frozen ice confectionery composition in a solidifying environment;
    continuously feeding the frozen ice confectionery composition at a temperature of −6° C. to −7° C. from the solidifying environment into a hopper;
    conveying a compressed gas into the hopper to maintain the frozen ice confectionery in the hopper at greater than atmospheric pressure;
    delivering the pressurized frozen ice confectionery composition from the hopper into a metering device to measure a predetermined volume of the frozen ice confectionery composition;
    filling a mold with the predetermined volume of the frozen ice confectionery composition and maintaining the composition in a frozen condition in the mold; and
    maintaining the frozen ice confectionery composition under a pressure greater than atmospheric pressure while filling the mold.

3. The process of claim 2, wherein the pressurized frozen ice confectionery composition delivered to the metering device comprises at least 50% frozen water.

4. The process of claim 3, wherein the frozen ice confectionery composition comprises 50% to 70% frozen water.

5. A process for preparing a molded ice confectionery article comprising:
    preparing a frozen ice confectionery composition in a solidifying environment;
    continuously feeding the frozen ice confectionery composition from the solidifying environment into a hopper, wherein the frozen ice confectionery composition comprises at least 50% by weight frozen water;
    conveying a compressed gas into the hopper to maintain the frozen ice confectionery in the hopper at greater than atmospheric pressure;
    delivering the pressurized frozen ice confectionery composition from the hopper into a metering device to measure a predetermined volume of the frozen ice confectionery composition;
    filling a mold with the predetermined volume of the frozen ice confectionery composition and maintaining the composition in a frozen condition in the mold; and
    maintaining the frozen ice confectionery composition under a pressure greater than atmospheric pressure through filling the mold.

6. The process of claim 2 or 5, wherein the frozen ice confectionery composition is under a pressure of 1.5 bar to less than 2 bar.

7. The process of claim 2 or 5, wherein the frozen ice confectionery composition is force-fed via pressure from the hopper to the metering device.

8. The process of claim 7, which further comprises force-feeding the frozen ice confectionery composition by a mixer within the hopper.

9. The process of claim 2 or 5, wherein the compressed gas comprises air.

10. The process of claim 2 or 5, wherein the frozen ice confectionery composition contains a plurality of inclusions comprising at least one of dried fruit pieces, candied fruit, chocolate pieces, fondant pieces, caramel pieces, or biscuit pieces.

11. The process of claim 2 or 5, wherein the solidifying environment comprises a freezer.

12. The process of claim 2 or 5, wherein the filling comprises spraying the composition into the mold with a nozzle.

13. The process of claim 2 or 5, wherein the hopper is sealed.

14. The process of claim 5, wherein the frozen ice confectionery is ice cream.

* * * * *